United States Patent [19]
Manchess

[11] Patent Number: 6,148,767
[45] Date of Patent: Nov. 21, 2000

[54] APPARATUS AND METHOD FOR PROVIDING AN ANIMAL WITH WATER

[76] Inventor: Lena M. Manchess, 4757 E. Greenway Rd., Ste 103-66, Phoenix, Ariz. 85032

[21] Appl. No.: 09/293,101

[22] Filed: Apr. 16, 1999

[51] Int. Cl.[7] ..................................................... A01K 7/00
[52] U.S. Cl. .................................................. 119/75; 119/74
[58] Field of Search ................................ 119/75, 74, 72, 119/73, 53.5

[56] References Cited

U.S. PATENT DOCUMENTS

| | | |
|---|---|---|
| 5,107,768 | 4/1992 | Johnson . |
| 5,138,980 | 8/1992 | Ewing ........................................ 119/73 |
| 5,452,683 | 9/1995 | Poffenroth ................................ 119/73 |
| 5,636,593 | 6/1997 | Wechsler . |
| 5,738,039 | 4/1998 | Berman et al. . |

*Primary Examiner*—Peter M. Poon
*Assistant Examiner*—Judith A. Nelson
*Attorney, Agent, or Firm*—Parsons & Goltry; Robert A. Parsons; Michael W. Goltry

[57] ABSTRACT

Apparatus for supplying an animal with drinking water comprising a bowl coupled with a flexible bladder containing water and a valve movable between a closed condition and an open condition for communicating the water into the bowl upon application of compressive force to the flexible bladder.

12 Claims, 2 Drawing Sheets

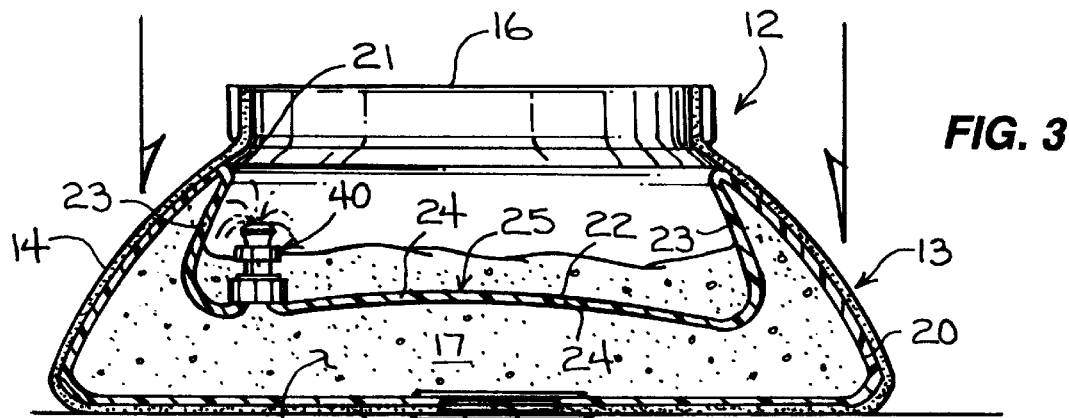
FIG. 3
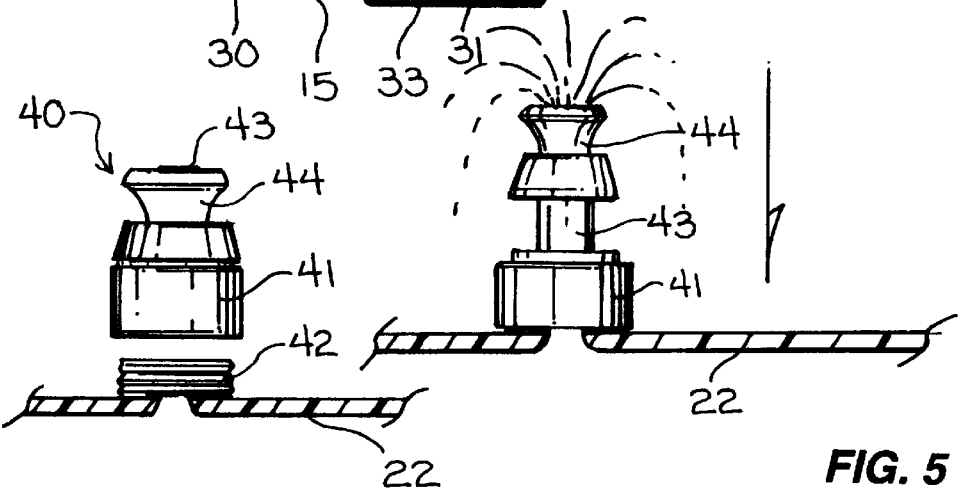
FIG. 4
FIG. 5
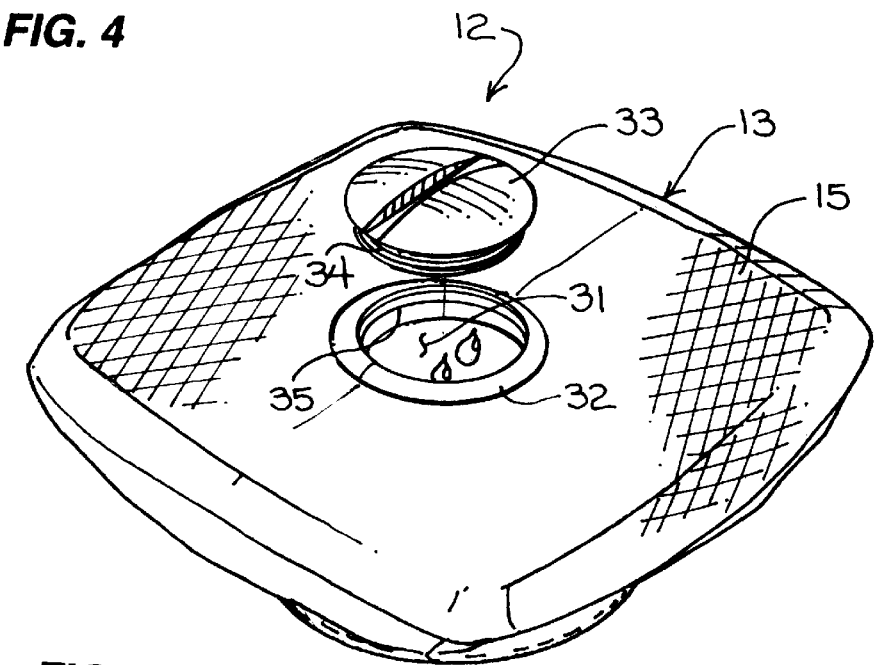
FIG. 6

APPARATUS AND METHOD FOR PROVIDING AN ANIMAL WITH WATER

FIELD OF THE INVENTION

This invention relates to convenience devices for use with domesticated animals and, more particularly, to apparatus for providing an animal with water.

BACKGROUND OF THE INVENTION

Domesticated animals, especially dogs and cats, often accompany their owners on walks and hikes and on vacation trips such as camping trips and outings to the beach. For most pet owners, it is important to bring nourishment and water on these trips for their pets. A variety of exemplary apparatus exist for allowing pet owners to transport pet food. Although skilled artisans have devoted a considerable amount of time toward portable devices for transporting pet drinking water, these notable efforts have yielded only marginally efficient and useful devices. Accordingly, the need for continued structural improvements in the art of portable watering apparatus is evident.

It would be highly desirable to provide new and improved apparatus for providing drinking water to domesticated pets.

It is a purpose of the invention to provide new and improved apparatus for providing drinking water to domesticated pets that is easy to construct.

It is another purpose of the invention to provide new and improved apparatus for providing drinking water to domesticated pets that is inexpensive.

It is still another purpose of the invention to provide new and improved apparatus for providing drinking water to domesticated pets that is easy to use.

It is a further provision of the invention to provide pet owners with an efficient means of transporting drinking water and of supplying the drinking water to their pets.

It is still a further provision of the invention to alleviate the frustration commonly experienced by pet owners when trying to transport drinking water for their pets.

It is yet still a further purpose of the invention to provide new and improved apparatus for providing drinking water to domesticated pets that is easy to store and transport.

It is another purpose of the invention to provide improved methods of supplying drinking water to a domesticated pet.

SUMMARY OF THE INVENTION

The above problems and others are at least partially solved and the above purposes and others realized new and improved apparatus and methods for providing a domesticated animal with drinking water. In a particular embodiment, apparatus of the invention comprises a bowl coupled with a flexible bladder for containing water and a valve movable between a closed condition for enclosing the flexible bladder and an open condition for communicating water to the bowl upon application of compressive force to the flexible bladder. The bladder may be formed in, or as part of, the base of the bowl and/or in, or as part of, one or more of the sides of the bowl. The flexible bladder includes an opening for receiving water into the flexible bladder and a closure for enclosing the opening.

BRIEF DESCRIPTION OF THE DRAWINGS

The foregoing and further and more specific objects and advantages of the invention will become readily apparent to those skilled in the art from the following detailed description taken in conjunction with the drawings in which:

FIG. 3 is a vertical sectional view of the apparatus taken along line 3—3 of FIG. 1, the apparatus including a bowl, a bladder, a valve coupling the bowl with the bladder in liquid communication and a closure obstructing an opening leading to the bladder;

FIG. 4 is a side view of the valve of FIG. 3 shown as it would appear detached;

FIG. 5 is a side view of the valve of FIG. 3 shown as it would appear in an open condition; and FIG. 6 is a bottom view of the apparatus of FIG. 3 showing the closure as it would appear detached from the opening.

DETAILED DESCRIPTION OF A PREFERRED EMBODIMENT

The present invention provides, among other things, improved apparatus and methods of transporting and supplying drinking water for domesticated pets. Ensuing embodiments of the invention are easy and inexpensive to construct and prove exemplary for allowing pet owners to transport drinking water and to provide or supply the drinking water to their pets.

Figure 1:
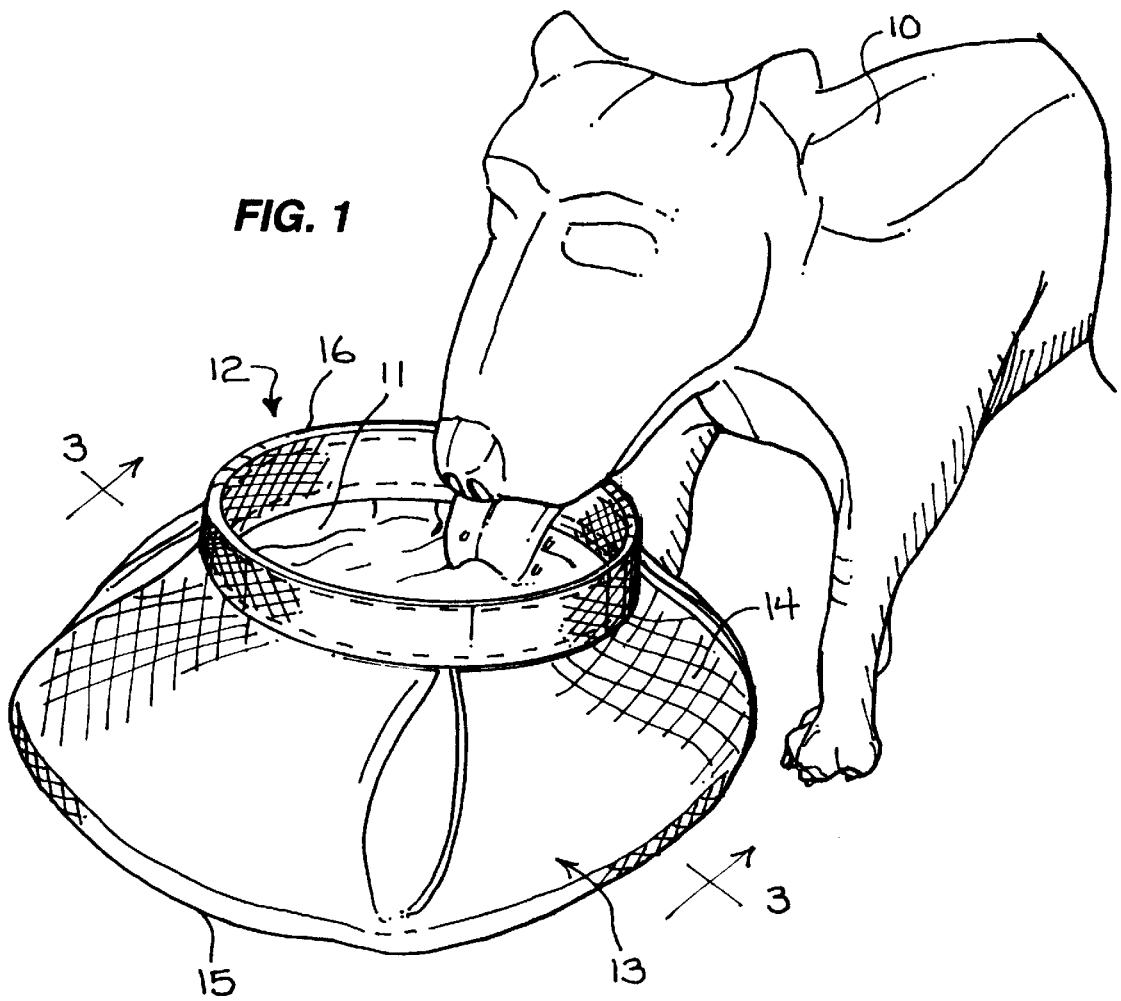
FIG. 1 is a perspective view of a domesticated animal as it would appear drinking water from apparatus for transporting and supplying drinking water in accordance with the invention.

Turning now to the drawings, in which like reference characters indicate corresponding elements throughout the several views, attention is first directed to FIG. 1 which illustrates a perspective view of a domesticated animal 10 as it would appear drinking water 11 from apparatus 12 for transporting and supplying the drinking water for consumption in accordance with the invention. Turning to FIG. 3 illustrating a vertical sectional view of apparatus 12 taken along line 3—3 of FIG. 1, apparatus 12 includes a receptacle 13 comprising a continuous sidewall 13 having a closed end 15 and an open end 16, all of which cooperate to bound a chamber 17. Receptacle 13 is preferably constructed of a flexible material that is substantially water impermeable such as water impermeable canvas, nylon or perhaps the substantially water impermeable material commonly found under the exemplary trademark GORTEX TM. Contained in receptacle 13 is a bladder or enclosure 20. Like receptacle 13, bladder 20 is also preferably constructed of a flexible material that is substantially water impermeable such as water impermeable canvas, nylon or perhaps the GORTEX TM material.

Bladder 20 is supported against the inner surfaces of the receptacle that define closed end 15 and that lead from closed end 15 toward open end 16 with a conventional adhesive or stitching. In this embodiment, bladder 20 defines a continuous upper edge 21 located in chamber 17 and directed toward, yet spaced from, open end 16. From this upper edge 21, bladder 20 defines a partition 22 intermediate closed end 15 and open end 16 that divides chamber 17. Partition 22 comprises a continuous sidewall 23 leading away from upper edge 21 and open end 16 to a closed end 24. Continuous sidewall 23 and closed end 24 cooperate to define a bowl 25 that communicates with, and faces, open end 16. Closed end 24 is deemed to be part of the base of the bowl 25, and the base of the bowl 25 is generally considered to be the bladder 20.

Bladder 20 is operative for containing water in the space 30 it bounds. In the embodiment shown in FIG. 3, this space 30 extends along continuous sidewall 23 and along closed end 24, although bladder 20 may be constructed to extend along only one side of continuous sidewall 23, along only closed end 24 or along closed end 24 and one side of continuous sidewall 23 if desired. To introduce water into bladder 20, the invention further includes an opening 31 extending through the closed end 15 of receptacle and the bladder 20. With momentary attention directed to FIG. 6, a rim 32 defines opening 31 through which water may be introduced for containment by bladder 20. Further provided is a plug or closure 33 engagable with rim 32 to enclose opening 32. Although a variety of engagement apparatus may be employed for engaging closure 33 to enclose opening 31, closure 33 supports threads 34 which are threadably engagable with complemental threads 35 supported by rim 32.

Figure 2:
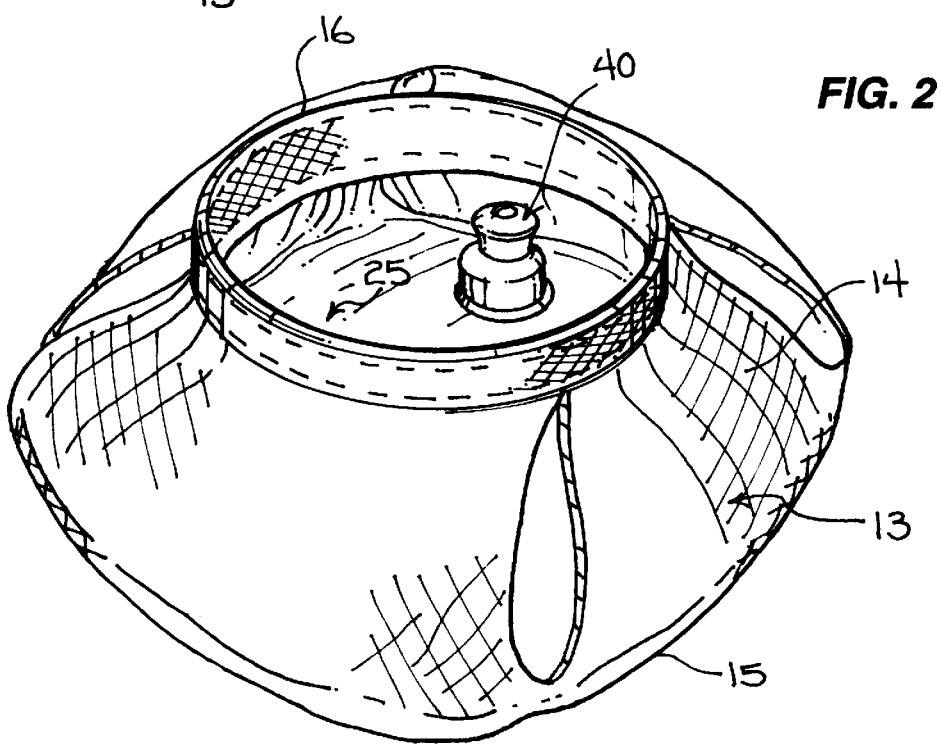
FIG. 2 is a perspective view of the apparatus of FIG. 1.

Turning back to FIG. 3, partition 22 supports a valve 40. In this embodiment, valve 40 is of a conventional type movable between a closed condition and an open condition for communicating water from bladder 20 to bowl 25. With attention directed to FIG. 4, valve 40 includes a base 41 engagable, such as by threaded or snap engagement, with an eyelet 42 mounted with partition 22 for communicating water therethrough. A stem 43 leads from base 41 that supports a cap 44 movable between a retracted position toward base 41 defining the closed condition of valve 40 and an extended position away from base as shown in FIG. 5 defining the open condition of valve 40. Valve 40 has been disclosed in connection with a preferred embodiment. However, those having regard toward the art will appreciate that other valve forms may be used without departing from the teachings of the invention. Furthermore, FIG. 3 shows the valve as it would appear mounted with the closed 24 of bowl 25, which is also shown in FIG. 2. However, valve 40 may be mounted with continuous sidewall 23 if so desired.

Having described the structural features of the invention, its function will now be addressed. In operation, a user may fill bladder 20 with water through opening 31 and then engage closure 33 to enclose opening 31. With valve 40 in the closed condition, apparatus 12 may be transported with the water safely contained in the bladder 20. To supply a dog, cat or other domesticated animal with water, the user may rest the closed end 15 of receptacle against a supporting surface, move valve 40 into its open condition and then exert a compressive force against the bladder 20 by, for instance, exerting a compressive force against the outer surface of receptacle 13. In response to exertion of this compressive force, water is forced from bladder 20 to bowl 25 through valve 40. After a desired amount of water has been passed into bowl 25, valve 40 may be moved into its closed condition. With water contained in bowl 25 as shown in FIG. 3, an animal may access it through open end 16 for drinking as shown in FIG. 1. After all or most of the water contained by the bladder 20 has been consumed, the flexibility of apparatus 12 allows a user to compactly fold and store it for transport, etc.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

1. Apparatus for supplying an animal with drinking water, comprising:
   a bowl having a base and upright side walls extending therefrom, defining a chamber;
   a flexible bladder carried by the bowl and forming a portion of the base underlying the chamber;
   a valve coupled to the flexible bladder and extending into the chamber, the valve movable between a closed condition for closing the flexible bladder and an open condition for communicating fluid to the chamber of the bowl upon application of compressive force to the flexible bladder.

2. Apparatus of claim 1, wherein the bowl is flexible.

3. Apparatus of claim 1, wherein the bladder extends into one or more of the sides.

4. Apparatus of claim 1, wherein the flexible bladder further includes an opening for receiving water into the flexible bladder and a closure for enclosing the opening.

5. Apparatus for supplying an animal with a fluid, comprising:
   a foldable receptacle bounding a chamber, the foldable receptacle having a closed end and an open end;
   a flexible partition dividing the chamber into an enclosure directed toward the closed end for holding a fluid, and a bowl directed toward the open end; and
   a valve mounted to the flexible partition and movable between a closed condition for closing the enclosure and an open condition for communicating fluid to the bowl upon application of compressive force to the enclosure.

6. Apparatus of claim 5, wherein the partition forms a base of the bowl.

7. Apparatus of claim 5, wherein the partition forms a continuous sidewall of the bowl.

8. Apparatus of claim 5, wherein the enclosure further includes an opening for communicating water into the enclosure and a closure for enclosing the opening.

9. In a device comprising a bowl coupled with a flexible bladder containing a fluid and a valve mounted with the flexible bladder for movement between a closed condition and an open condition, a method of supplying the bowl with the fluid comprising the steps of:

moving the valve into the open condition; and applying compressive force to the flexible bladder to force the fluid from the flexible bladder into the bowl.

10. The method of claim 9, wherein after the step of applying, further including the step of moving the valve into the closed condition.

11. In a device comprising:

a flexible receptacle bounding a chamber, the flexible receptacle having a closed end and an open end;

a flexible partition dividing the chamber into an enclosure directed toward the closed end and a bowl directed toward the open end, the enclosure containing a fluid; and a valve mounted with the partition for movement between a closed condition and an open condition;

a method of supplying the bowl with the fluid, comprising the steps of:

moving the valve into the open condition; and applying compressive force to the enclosure to force the fluid from the enclosure into the bowl.

12. The method of claim 11, wherein after the step of applying, further including the step of moving the valve into the closed condition.

\* \* \* \* \*